June 10, 1930.  M. J. DUFFY  1,763,505
SELF TIGHTENING NUT
Filed Sept. 4, 1929

Michael J. Duffy,
INVENTOR

BY Victor J. Evans
ATTORNEY

WITNESS

Patented June 10, 1930

1,763,505

UNITED STATES PATENT OFFICE

MICHAEL J. DUFFY, OF BROOKLYN, NEW YORK

SELF-TIGHTENING NUT

Application filed September 4, 1929. Serial No. 390,337.

This invention relates to self tightening nuts, and aims to provide a nut tightening device capable of general application to bolts of practically any type.

The primary object of the invention is to enable the nut tightening device to exert a constantly acting force in the screw-up direction of rotation of the nut, tending to hold the nut in its final screwed up, or rest position, thus making the nut in effect, self-tightening.

A further object is to enable the nut tightening device to be constructed so that it may be quickly and easily applied to the bolt, and not easily dislodged when secured in place.

A still further object is to enable the base of the nut tightening device to constitute a washer beneath the head of the bolt, thus avoiding the necessity for providing a separate washer.

Other objects are to simplify and improve the construction of devices of this type and render them more efficient in use besides enabling the same to be manufactured at small expense.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings—

Similar reference characters refer to similar parts throughout the several views of the drawing.

Figure 1:
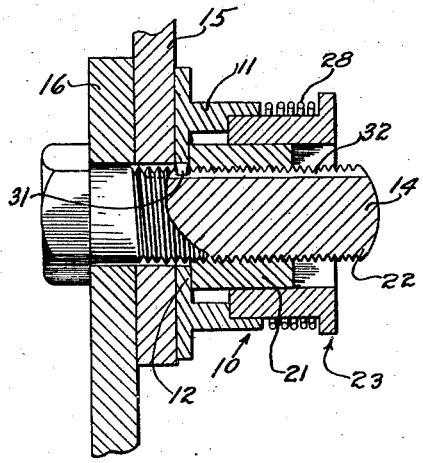
Fig. 1 is a longitudinal sectional view through the nut tightening device showing the same in operative position upon a bolt.
Figure 2:
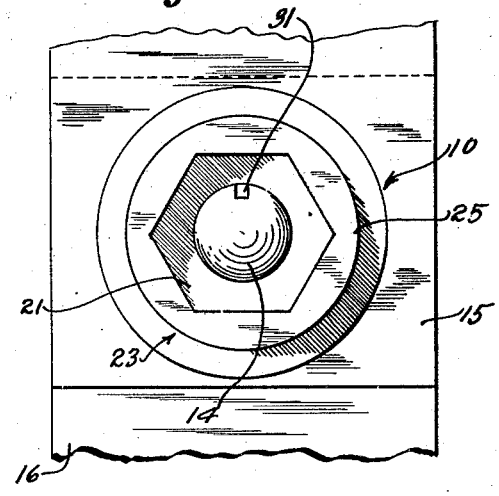
Fig. 2 is an end elevation of the device as shown in Fig. 1.
Figure 3:
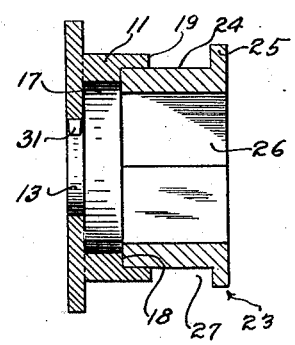
Fig. 3 is a view similar to Fig. 1, but showing, in assembled relation, certain parts only.
Figure 4:
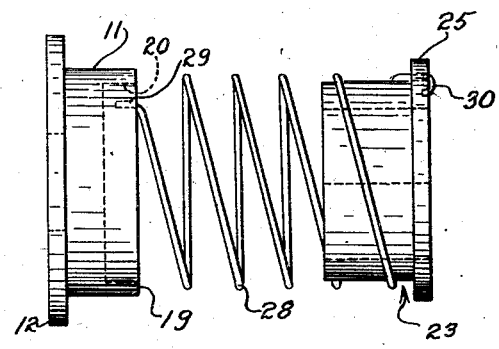
Fig. 4 is a side elevation of said parts and an operating coil spring, all elements separated or expanded, as in applying the device.

The nut tightening device 10 comprises, in this instaonce, a cylindrical base portion 11 having an inwardly extending annular flange 12 provided with an opening 13 adapted to receive a standard diameter bolt 14. For illustration, the bolt 14 is shown in its screwed up condition as applied to securing together suitable members 15 and 16.

The base portion 11 includes an inner annular recess 17 forward of the flange 12, this recess terminating at an annular shoulder 18, which with the outer rim 19 of the base portion 11, defines an outer annular recess 20.

The hexagonal nut 21 is adapted to be screwed down on the threaded portion 22 of the bolt 14 within the recess 17, this nut 14 bearing against the inwardly extending flange 12, which in this instance takes the place of a washer.

A locking member is adapted to cooperate with the base portion 11; and this locking member preferably comprises a cylindrical body 23 including an annular neck 24, an outer annular rim 25, and a hexagonal open portion 26. This open portion 26 is adapted to receive the major portion of the nut 21, and the annular neck 24 of the locking member body 23 is adapted to enter the outer annular recess 20 between the nut and the outer rim 19.

The forward end of the rim 19, inner face of the outer rim 25, and outer side of the annular neck 24 cooperate to produce an annular groove 27 between the base portion 11 and locking member 23. A suitable coiled spring 28 surrounds the annular neck 24, within this groove 27; and this spring has its opposite ends suitably secured to the rim 19 and outer rim 25, as indicated at 29 and 30, respectively, the spring being coiled to exert force in the tightening direction of rotation of the nut 21.

The inwardly extending annular flange 12 may be provided with a key 31 adapted to lodge in a keyway or groove 32 extending longitudinally along the bolt 14, thus positively restraining the base portion from rotation relative to the bolt 14. The key 31 may be omitted however, and the nut simply screwed down against the inwardly extending flange 12, which in practice may be all that is necessary to hold the base portion 11 against rotation.

In use, the base portion 11 is placed over the free end of the bolt, and the nut is then tightly screwed down, the locking member 23, during this operation, being separated from the base portion 11. The spring 28 is then wound up to exert force in the direction of rotation of the nut 21 and the locking member is then placed over the nut, the latter entering the hexagonal open portion 26, and the neck portion 24 lodging against the shoulder 18 in the annular recess 20. In this position of the parts, the force of the spring will act in a direction tending to tighten the nut on the bolt, and will hold the nut in position regardless of vibration or other agencies tending to unintentionally loosen the nut, thus rendering the nut in effect, self-tightening.

The hereinbefore described construction admits of considerable modifications without departing from the invention; therefore, I do not wish to be limited to the precise arrangements shown and described, which are, as aforesaid, by way of illustration merely. In other words, the scope of protection contemplated is to be taken solely from the appended claims, interpreted as broadly as is consistent with the prior art.

What I claim as new is:

1. The combination with a bolt and nut, of a self tightening device comprising a hollow cylindrical body having an internal annular recess and an inwardly extending flange, said inwardly extending flange having a bolt receiving opening, said nut adapted to be threaded on said bolt and against said inwardly extending flange, a cylindrical locking member cooperative with said base, said locking member having a neck portion including an angular open portion to receive said nut in locking relation, said neck portion adapted to enter said base portion and resilient means, effective between said base and said locking member to exert force in the direction of inward rotation of said nut, whereby to maintain the nut tightly in position against unintentional dislodgment.

2. The combination with a bolt and nut, of a self tightening device comprising a hollow cylindrical body having an internal annular recess and an inwardly extending flange, said inwardly extending flange having a bolt receiving opening, said nut adapted to be threaded on said bolt and against said inwardly extending flange, a cylindrical locking member cooperative with said base, said locking member having a neck portion including an angular open portion to receive said nut in locking relation, said neck portion adapted to enter said base portion and resilient means, effective between said base and said locking member to exert force in the direction of inward rotation of said nut, whereby to maintain the nut tightly in position against unintentional dislodgment, said resilient means comprising a coiled spring having one end secured to said base and the opposite end secured to said locking member, said base and locking member having a cooperative groove to receive said coiled spring.

3. The combination with a bolt and nut, of a self tightening device comprising a hollow cylindrical body having an internal annular recess and an inwardly extending flange, said inwardly extending flange having a bolt receiving opening, said bolt having a longitudinal groove and said inwardly extending flange having a key to enter said groove to positively hold said base on said bolt against rotation, said nut adapted to be threaded on said bolt and against said inwardly extending flange, a cylindrical locking member cooperative with said base, said locking member having a neck portion including an angular open portion to receive said nut in locking relation, said neck portion adapted to enter said base portion and resilient means, effective between said base and said locking member to exert force in the direction of inward rotation of said nut, whereby to maintain the nut tightly in position against unintentional dislodgment.

4. The combination with a bolt and nut, of a self tightening device comprising a hollow cylindrical body having an internal annular recess and an inwardly extending flange, said inwardly extending flange having a bolt receiving opening, said bolt having a longitudinal groove and said inwardly extending flange having a key to enter said groove to positively hold said base on said bolt against rotation, said nut adapted to be threaded on said bolt and against said inwardly extending flange, a cylindrical locking member cooperative with said base, said locking member having a neck portion including an angular open portion to receive said nut in locking relation, said neck portion adapted to enter said base portion and resilient means, effective between said base and said locking member to exert force in the direction of inward rotation of said nut, whereby to maintain the nut tightly in position against unintentional dislodgment, said resilient means comprising a coiled spring having one end secured to said base and the opposite end secured to said locking member, said base and locking member having a cooperative groove to receive said coiled spring.

In testimony whereof I hereby affix my signature.

MICHAEL J. DUFFY.